(No Model.)
T. H. BESSE.
ICE CREAM FREEZER.
No. 449,434.  Patented Mar. 31, 1891.
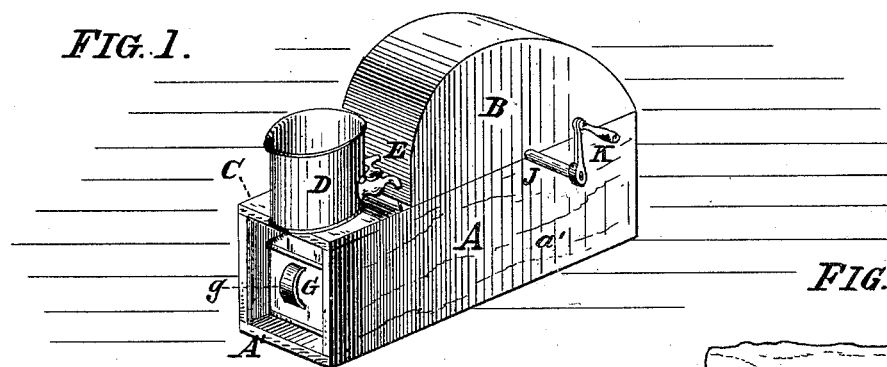
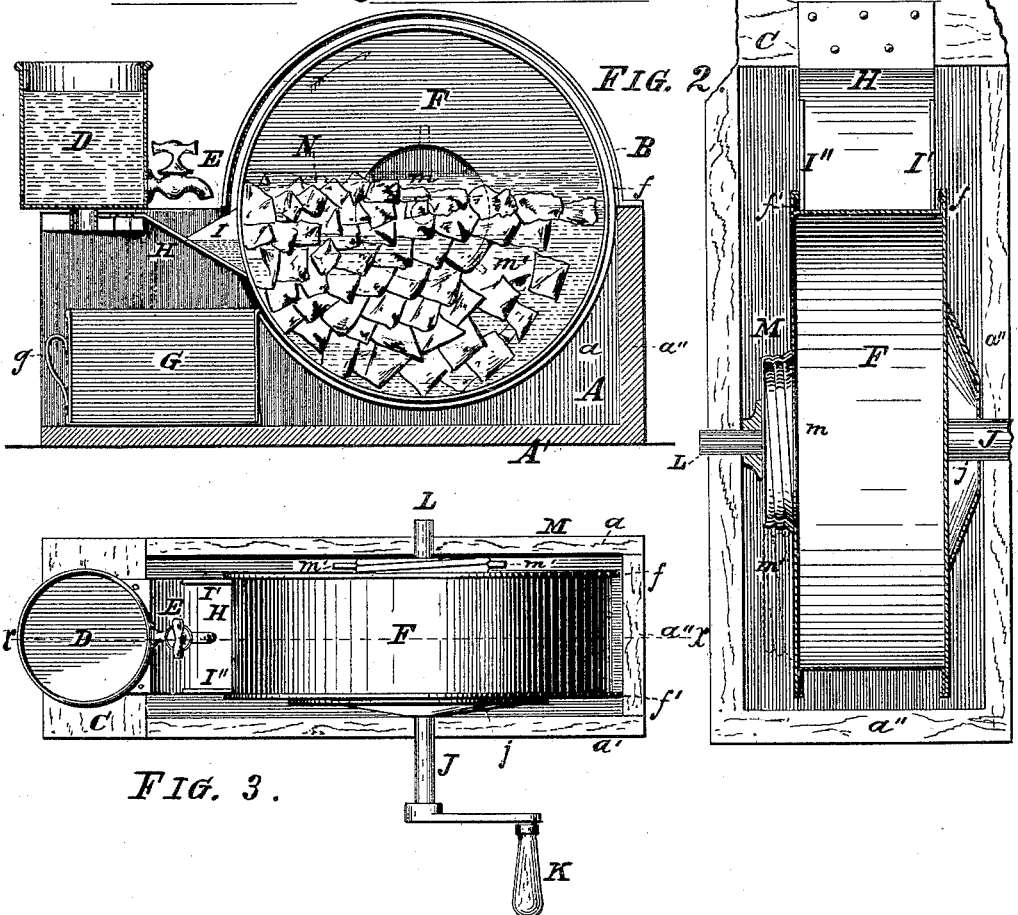
Witnesses:
Al Stark
Centie S. Stark
Inventor:
Thomas H. Besse
by Michael J. & Wm O. Stark,
Attorneys.

UNITED STATES PATENT OFFICE.

THOMAS H. BESSE, OF BUFFALO, NEW YORK.

ICE-CREAM FREEZER.

SPECIFICATION forming part of Letters Patent No. 449,434, dated March 31, 1891.

Application filed December 20, 1890. Serial No. 375,358. (No model.)

*To all whom it may concern:*

Be it known that I, THOMAS H. BESSE, of Buffalo, in the county of Erie and State of New York, have invented certain new and useful Improvements on Ice-Cream Freezers; and I do hereby declare that the following description of my said invention, taken in connection with the accompanying sheet of drawings, forms a full, clear, and exact specification, which will enable others skilled in the art to which it appertains to make and use the same.

This invention has general reference to improvements in ice-cream freezers; and it consists, essentially, in the novel and peculiar combination of parts and details of construction, as hereinafter first fully set forth and described, and then pointed out in the claims.

In the drawings already mentioned, which serve to illustrate my said invention more fully, Figure 1 is a perspective view of my improved ice-cream freezer. Fig. 2 is a longitudinal sectional elevation in line $x\ x$ of Fig. 3. Fig. 3 is a plan of the device, the cover being removed. Fig. 4 is a plan, on a slightly-increased scale, showing the drum in section.

Like parts are designated by corresponding letters of reference in all the figures.

The object of this invention is the production of a simple and very efficient ice-cream freezer which shall be capable of freezing the cream in the shortest possible time with the smallest expenditure of the freezing agent. To accomplish these results I construct this ice-cream freezer substantially as follows:

A is a rectangular wooden (or metallic, if preferred) case, having a bottom A′, two longitudinal sides $a\ a'$, and one end $a''$, the opposite end and the top being left open, as shown in the several figures. In this top and adjoining the open end there is a cross-piece C, upon which is located a reservoir D for the reception of the cream, it being provided with a faucet E to regulate the flow of the cream from the reservoir D.

Within the sides $a\ a'$ of the case A there are semicircular notches, serving as bearings for the shafts L J of a drum F, constructed of very thin sheet metal and preferably of copper, brass, or zinc on account of their being excellent conductors of heat. In one of the heads of this drum there is centrally an opening $m$, closed by a screw-cap M, which cap carries centrally the shaft portion L, while the other head has affixed to its outside a flaring disk $j$, forming a support for the other shaft portion J, a handle K being secured to this end of the shaft J in order to enable the drum F being conveniently revolved.

To the cross-piece C is attached a downwardly and obliquely arranged metallic incline H, which has on both of its lower edges upwardly-projecting side pieces I′ I″, so as to form on the lower end of said incline, in conjunction with the drum F, a feeding-trough I, Fig. 2, into which the cream flows and where the periphery of the drum F passes through this feeding-trough I and is covered with the cream, and where it immediately solidifies, owing to the introduction of a suitable freezing-mixture N, such as broken ice and salt or other suitable chemicals, into the drum through the opening $m$, and which freezing mixture or agent reduces the temperature of the drum to and below the freezing-point.

The lower edge of the incline H bears against the periphery of the drum F, thereby acting as a scraper, so that the frozen cream will be scraped from the periphery of said drum and be discharged into a receiver G, placed into the casing A, through the open end thereof, the drum being revolved in the direction of the arrow in Fig. 2.

The drum F is preferably covered with a hood B, as illustrated in Figs. 1 and 2, so as to isolate the same from the outer atmosphere, and thereby not to affect the same by the warmer temperature thereof as much as it would be affected were it exposed thereto.

In order to confine the cream upon the periphery of the drum F and to prevent it from adhering and freezing upon the heads thereof, I provide said drum with laterally-projecting flanges $f\ f'$, and arrange the incline H with its sides I′ I″ so as to pass between these flanges. This construction is an essential feature in an ice-cream freezer of the class described, preventing waste of cream and otherwise contributing toward the perfect operation of the device.

Instead of locating the screw-cap M, which hermetically seals the drum F, in the center thereof and securing the shaft portion L upon said cap, I may locate the screw-cap M on the side of the center, as indicated in dotted lines in Fig. 4, such construction being the equivalent of the one described and within the scope of my invention, and being, perhaps, the more preferable form in larger devices where large quantities of ice-cream are being frozen upon the drum. In order to enable this screw-cap being readily removed and replaced, it is provided with lugs $m'$, as indicated in dotted lines in Fig. 2.

The ice cream scraped from the drum F collects in the receiver G in helical flakes. It freezes perfectly even upon the drum, and is devoid of icy lumps so frequently found in ice-cream frozen in revolving receptacles where stirrers are employed and where a perfect mixture is next to an impossibility.

It will be readily observed that this ice-cream freezer is perfectly simple in its construction, consists of but few parts, and may be manufactured and sold at such a low price as to bring it within reach of every family.

Having thus fully set forth my invention and the best means for carrying it into effect, I claim as new and desire to secure by Letters Patent of the United States—

1. The improved ice-cream freezer hereinbefore described, consisting, essentially, of a box-shaped case A, having one of its ends open and upon its top a cross-piece C, the reservoir D upon said cross-piece and provided with a faucet E, the incline H, having the two upwardly-projecting sides I' I'', forming a feeding-trough I, the drum F upon the shafts L J and arranged with its periphery against the incline and its side pieces, a sealed filling-opening in one of the heads of the drum, projecting flanges $f\ f'$ on said drum, and a receiver G below the incline, as and for the object stated.

2. In an ice-cream freezer, a drum journaled upon bearings, as described and provided with laterally-projecting flanges on its heads, in combination with a feeding-trough having upwardly-projecting sides, the ends of which and of the incline are in contact with the periphery of the drum between said flanges, as set forth.

3. In an ice-cream freezer, the combination, with a rotatable refrigerant-cylinder, of a feeding-trough having an inclined bottom, the lower edge of which is in contact with the periphery of the cylinder, so as to act as a scraper for the frozen cream, as stated.

In testimony that I claim the foregoing as my invention I have hereto set my hand in the presence of two subscribing witnesses.

T. H. BESSE.

Attest:
MICHAEL J. STARK,
WM. O. STARK.